(12) United States Patent
Watanabe et al.

(10) Patent No.: US 9,692,201 B2
(45) Date of Patent: Jun. 27, 2017

(54) OPTICAL-FIBER-BUNDLE STRUCTURE, RARE-EARTH-DOPED MULTI-CORE FIBER, CONNECTION STRUCTURE THEREFOR, METHOD FOR EXCITING RARE-EARTH-DOPED MULTI-CORE FIBERS, AND MULTI-CORE-OPTICAL-FIBER AMPLIFIER

(71) Applicant: FURUKAWA ELECTRIC CO., LTD., Chiyoda-ku, Tokyo (JP)

(72) Inventors: Kengo Watanabe, Tokyo (JP); Tsunetoshi Saito, Tokyo (JP); Yukihiro Tsuchida, Tokyo (JP); Koichi Maeda, Tokyo (JP); Katsunori Imamura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/835,641

(22) Filed: Aug. 25, 2015

(65) Prior Publication Data

US 2016/0028206 A1    Jan. 28, 2016

Related U.S. Application Data

(63) Continuation of application No. PCT/JP2014/054655, filed on Feb. 26, 2014.
(Continued)

(51) Int. Cl.
*H01S 3/094* (2006.01)
*H01S 3/067* (2006.01)
(Continued)

(52) U.S. Cl.
CPC ...... *H01S 3/094042* (2013.01); *G02B 6/2552* (2013.01); *G02B 6/2856* (2013.01);
(Continued)

(58) Field of Classification Search
CPC ......... H01S 3/094042; H01S 3/094053; H01S 3/06754; H01S 3/094003; G02B 6/02042; G02B 6/40
See application file for complete search history.

(56) References Cited

U.S. PATENT DOCUMENTS 8,693,088 B2    4/2014   Fini et al.
8,725,001 B2    5/2014   Fini et al.
(Continued)

FOREIGN PATENT DOCUMENTS

DE    19736155 A1    2/1999
JP    5-299733 A    11/1993
(Continued)

OTHER PUBLICATIONS

K. S. Abedin et al., "Cladding-pumped erbium-doped multicore fiber amplifier", Optics Express, Aug. 27, 2012, vol. 20, No. 18, pp. 20191-20200.
(Continued)

*Primary Examiner* — Eric Bolda
(74) *Attorney, Agent, or Firm* — Hauptman Ham, LLP

(57) ABSTRACT

A bundle structure is obtained by arranging optical fibers having equal diameters in a close-packed arrangement around the outer circumference of a center optical fiber. The optical fibers are signal light optical fibers that transmit signal lights. The optical fiber is a pump light optical fiber that transmits pump light. The number of optical fibers is equal to the number of cores in the multi-core fiber. The bundle structure and the multi-core fiber are connected to one another by adhering or fusing. The cores and the cores are optically connected, and the core and the cladding are optically connected. When connecting, the mode field diameter of the cores and the cores are substantially equivalent. In addition, the outer diameter (diameter of circumscribed circle including optical fibers) of the bundle structure is set
(Continued)

so as not to be greater than the outer diameter of the multi-core fiber.

8 Claims, 8 Drawing Sheets

Related U.S. Application Data

(60) Provisional application No. 61/769,375, filed on Feb. 26, 2013.

(51) Int. Cl.
  *G02B 6/02* (2006.01)
  *H01S 3/16* (2006.01)
  *G02B 6/28* (2006.01)
  *G02B 6/255* (2006.01)
  *G02B 6/40* (2006.01)

(52) U.S. Cl.
  CPC ............ *G02B 6/40* (2013.01); *H01S 3/06737* (2013.01); *H01S 3/06783* (2013.01); *G02B 6/02042* (2013.01); *H01S 3/06745* (2013.01); *H01S 3/094003* (2013.01); *H01S 3/1608* (2013.01)

(56) References Cited

U.S. PATENT DOCUMENTS

| | | | |
|---|---|---|---|
| 9,007,681 B2 | 4/2015 | Zhu | |
| 9,025,239 B2 | 5/2015 | Zhu | |
| 9,252,556 B2 | 2/2016 | Matsuo et al. | |
| 2002/0126974 A1* | 9/2002 | Bayart | H01S 3/06716 385/127 |
| 2009/0201575 A1 | 8/2009 | Fermann et al. | |
| 2010/0118897 A1* | 5/2010 | Tanigawa | G02B 6/02042 372/6 |
| 2011/0274435 A1 | 11/2011 | Fini et al. | |
| 2011/0279888 A1* | 11/2011 | Fini | G02B 6/2835 359/334 |
| 2012/0294607 A1* | 11/2012 | Winzer | H01S 3/094061 398/28 |
| 2014/0010500 A1* | 1/2014 | Saito | G02B 6/3885 385/70 |
| 2014/0010501 A1 | 1/2014 | Saito et al. | |
| 2014/0178024 A1* | 6/2014 | Takenaga | G02B 6/02042 385/126 |
| 2014/0233893 A1* | 8/2014 | Mei | G02B 6/02042 385/76 |
| 2015/0318661 A1 | 11/2015 | Matsuo et al. | |

FOREIGN PATENT DOCUMENTS

| | | |
|---|---|---|
| JP | 5-345632 A | 12/1993 |
| JP | 10-125988 A | 5/1998 |
| JP | 2005-203549 A | 7/2005 |
| JP | 2011-512653 A | 4/2011 |
| JP | 2013-33865 A | 2/2013 |
| WO | 2011/116075 A1 | 9/2011 |
| WO | 2012/121318 A1 | 9/2012 |
| WO | 2012/121320 A1 | 9/2012 |
| WO | 2012/172996 A1 | 12/2012 |

OTHER PUBLICATIONS

International Search Report for PCT/JP2014/054655 mailed May 20, 2014.
Office Action in U.S. Appl. No. 14/834,448, mailed Jun. 2, 2016.

* cited by examiner

OPTICAL-FIBER-BUNDLE STRUCTURE, RARE-EARTH-DOPED MULTI-CORE FIBER, CONNECTION STRUCTURE THEREFOR, METHOD FOR EXCITING RARE-EARTH-DOPED MULTI-CORE FIBERS, AND MULTI-CORE-OPTICAL-FIBER AMPLIFIER

RELATED APPLICATIONS

The present application is a continuation of International Application Number PCT/JP2014/054655, filed Feb. 26, 2014, which claims benefit of U.S. Provisional Application No. 61/769,375, filed Feb. 26, 2013, the disclosures of which applications are hereby incorporated by reference herein in their entirety.

TECHNICAL FIELD OF THE INVENTION

This invention relates to an optical-fiber-bundle structure, which can introduce pump light into a rare-earth-doped multi-core fiber, and the like.

BACKGROUND OF THE INVENTION

The transmission capacity of single-core optical fibers used in the present situations is approaching its limit due to the recent rapid traffic increase in optical communications. As a means for further expanding the communication capacity, a multi-core fiber, which is a fiber having a plurality of cores formed therein, has been proposed.

In order to realize a transmission line by a multi-core fiber, an optical-fiber amplifier adapted to a multi-core fiber is required. An optical fiber doped by a rare-earth material such as erbium is used for the optical-fiber amplifier. Entering pump light into such a rare-earth-doped optical fiber allows light to be amplified.

As for an optical-fiber amplifier, there are core excitation, in which pump light enters into cores, and cladding excitation, in which pump light enters into claddings. Here, if cladding excitation is chosen for the multi-core fiber, light sources for pump light as many as the cores become unnecessary so to suppress the electrical power consumption. Therefore, a method for entering pump light into claddings of a multi-core fiber configuring an optical-fiber amplifier is required.

As such an optical-fiber amplifier, provided is an optical-fiber collective amplifier, in which a plurality of cores are positioned in a cladding and pump light is introduced into a multi-core fiber having a cladding that is doped with an optical amplifying material (Patent Document 1).

RELATED ART

Patent Documents

[Patent Document 1] Japanese Unexamined Patent Application Publication No. H10-125988 (JP-A-H10-125988)

SUMMARY OF THE INVENTION

Problems to be Solved by the Invention

However, although pump light is introduced into a multi-core fiber using "a multiplexer" in the structure described in Patent Document 1, a specific structure for efficiently introducing pump light into a multi-core fiber is not described therein. Therefore, a means to efficiently introduce pump light into a cladding is desired.

The present invention was achieved in view of such problems. Its object is to provide an optical-fiber-bundle structure and the like that can efficiently introduce pump light into a cladding section of a rare-earth-doped optical fiber.

Means for Solving Problems

To achieve the above object, a first invention is an optical-fiber-bundle structure that can introduce pump light into a rare-earth-doped multi-core fiber and comprises a pump light optical fiber that transmits pump light, which is positioned at the center on the cross section thereof, and signal light optical fibers that transmit signal lights, which are positioned in a close-packed arrangement on the outer circumference of the pump light optical fiber that transmits pump light, wherein the diameter of the pump light optical fiber is greater than the diameter of the signal light optical fiber.

The pump light optical fiber is preferably a multi-mode optical fiber.

The end parts of the pump light optical fiber that transmits pump light and the signal light optical fibers may be held by a capillary, and at least a part of the pump light optical fiber inside the capillary may be formed only by a core without claddings.

The signal light optical fiber may include a center core, a second core that is formed on the outer circumference of the center core and has a refractive index lower than the refractive index of the center core, and a cladding that is formed on the outer circumference of the second core and has a refractive index lower than the refractive index of the second core.

The pump light optical fiber may be a tapered fiber having a tapered part in which the diameter thereof decreases towards the end part thereof.

The pump light optical fiber may comprise a center cladding, a core section that is arranged on the outer circumference of the center cladding and having a refractive index higher than the refractive index of the center cladding, and a outer-circumference cladding that is arranged on the outer circumference of the core section and having a refractive index lower than the refractive index of the core section, and the core section may be formed like a ring on the cross-section.

According to the first invention, since the pump light optical fiber is positioned at the center on the cross-section thereof, it is possible to introduce pump light to the center of the rare-earth-doped multi-core fiber. Also, since the signal light optical fibers are in a close-package arrangement on the outer circumference of the pump light optical fiber, it is possible to optically connect cores of the signal light optical fibers and the rare-earth-doped multi-core fiber.

Also, if the pump light optical fiber is a multi-mode optical fiber, it is possible to introduce pump light of greater power.

Also, by eliminating the cladding of the pump light optical light in the capillary and forming the pump light optical fiber with only a core, a part of the pump light leaks out to the signal light optical fibers inside the capillary and it is possible to confine the pump light in the claddings of the signal light optical fibers. Therefore, the pump light can be introduced to the vicinity of the core of the rare-earth-doped multi-core fiber.

In this case, the pump light optical fiber may be formed by a gradient-index optical fiber.

Also, by making the core of the signal light optical fiber a double-layered structure with the second core, which is formed on the outer circumference of the center core and has a refractive index lower than that of the center core and higher than that of the cladding, the pump light leaking out from the pump light optical fiber at the center can be collected to the vicinity of the cores of the signal light optical fibers. Therefore, the pump light can be introduced to the vicinity of the core of the rare-earth-doped multi-core fiber.

Also, if the pump light optical fiber is a tapered fiber with a tapered part in which its diameter decreases towards the end part, it is possible to reduce the size of the bundle structure, and, if the cladding diameter of the signal light optical fiber is predetermined, it is possible to adapt the structure to the number of the fibers.

Also, if the core section of the pump light optical fiber is formed like a ring, the pump light is collected to the part closed to the cores of the signal light optical fibers so that the pump light can be introduced to the vicinity of the core of the rare-earth-doped multi-core fiber.

A second invention is a rare-earth-doped multi-core fiber comprising cores, which are positioned on a same circumference at a predetermined pitch on the cross-section thereof, and a cladding, which covers the cores and has a refractive index lower than that of the cores, wherein the cladding has a high-refractive-index cladding having a relatively higher refractive index and a low-refractive-index cladding having a relatively lower refractive index, and at least the outer circumference of the cores is configured by the high-refractive-index cladding.

It is preferable that, on the cross-section, the center part is the low-refractive-index cladding, the high-refractive-index cladding is formed like a ring on the outer circumference of the low-refractive-index cladding, and the cores are positioned inside the high-refractive-index cladding.

The high-refractive-index cladding may be formed on the outer circumference of each a plurality of the cores respectively and the high-refractive-index claddings may be covered by the low-refractive-index cladding.

According to the second invention, since the cladding comprises a high-refractive-index cladding and a low-refractive-index cladding and the high-refractive-index cladding is arranged on the outer circumference of the cores, the pump light that is introduced into the cladding can be collected to the high-refractive-index cladding. Therefore, the pump light can be collected to the vicinity of the cores of the rare-earth-doped multi-core fiber so that a high optical amplifying efficiency can be obtained.

For example, if a high-refractive-index cladding is formed like a ring and the cores are placed inside the high-refractive-index cladding, the pump light can be collected to the ring-shaped high-refractive-index cladding. Also, if each of the high-refractive-index claddings is positioned on the outer circumference of each of the cores, pump light can be collected only to the outer circumference section of the cores.

A third invention is a connection structure for an optical-fiber-bundle structure and a rare-earth-doped multi-core fiber. The optical-fiber-bundle structure comprises a pump light optical fiber that transmits pump light, which is arranged at the center thereof, and peripheral optical fibers, which are in a close-packed arrangement on the outer circumference of the pump light optical fiber that transmits pump light, wherein the diameter of the pump light optical fiber is larger than the diameter of the peripheral optical fiber and at least a part of the peripheral optical fibers is a signal light optical fiber that transmits signal light. The rare-earth-doped multi-core fiber comprises cores, which are optically connected with the signal light optical fiber at a predetermined pitch on a same circumference, and a cladding, which has a refractive index lower than that of the cores, covers the cores, and are optically connected with the pump light optical fiber. The cladding includes a high-refractive-index cladding having a relatively high refractive index and a low-refractive-index cladding having a relatively low refractive index, and at least the outer circumference of the cores includes the high-refractive-index cladding.

A part of the peripheral optical fibers may be dummy fibers, and the signal light optical fiber may be interposed between the dummy fibers and the signal light optical fibers may be arranged at predetermined intervals.

According to the third invention, it is possible to optically connect an optical-fiber-bundle structure with a rare-earth-doped multi-core fiber with certainty. Also, it is possible to introduce pump light into the vicinity of the cores of the rare-earth-doped multi-core fiber.

Also, if the signal light optical fibers that transmit signal lights and dummy fibers are alternately arranged, for example, so to obtain the peripheral optical fibers configuring the optical-fiber-bundle structure, the diameter of the center exciting light optical fiber can be larger to the cores with the predetermined pitch. Therefore, pump light with greater power can be introduced.

The fourth invention is a method for exciting a rare-earth doped multi-core fiber comprising a step of connecting an optical fiber bundle structure and a rare-earth doped multi-core fiber. The optical fiber bundle structure comprises a pump light optical fiber that transmits pump light arranged at the center and peripheral optical fibers arranged close-packed on the outer circumference of the pump light optical fiber. The diameter of the pump light optical fiber is greater than the diameter of the peripheral fiber and at least a part of the peripheral optical fibers is a signal light optical fiber that transmits signal light. The rare-earth doped multi-core fiber comprises rare-earth doped cores that are optically connected with the signal light optical fibers at the predetermined pitch on the same circumference and a cladding having a refractive index lower than that of the cores. The cladding covers the cores and is optically connected with the pump light optical fiber. The pump light is introduced to the cladding of the rare-earth doped multi-core fiber.

A fifth invention is a multi-core optical fiber amplifier comprising an optical fiber bundle structure, a rare-earth doped multi-core fiber, and a light source. The optical fiber bundle structure comprises a pump light optical fiber that transmits pump light arranged at the center and peripheral optical fibers arranged close-packed on the outer circumference of the pump light optical fiber, wherein the diameter of the pump light optical fiber is greater than the diameter of the peripheral optical fiber and at least a part of the peripheral optical fibers is a signal light optical fiber that transmits signal light. The rare-earth doped multi-core fiber comprises rare-earth doped cores that are optically connected with the signal light optical fibers at the predetermined pitch on the same circumference and a cladding having a refractive index lower than that of the cores. The cladding covers the cores and is optically connected with the pump light optical fiber. The light source introduces pump light to the cores of the rare-earth doped multi-core fiber. The pump light from the source is introduced to the cladding of the rare-earth doped multi-core fiber using the pump light optical fiber of the optical-fiber-bundle structure.

According to the fourth and fifth inventions, the signal light inside the multi-core fiber can be efficiently amplified.

Effects of the Invention

The present invention can provide an optical-fiber-bundle structure and the like that can efficiently introduce pump light into a cladding section of a rare-earth-doped optical fiber.

BRIEF DESCRIPTION OF DRAWINGS

FIG. 2 (b) is a cross sectional view of the connection structure for fibers 1 taken along B-B line in FIG. 1.
FIG. 3 shows a bundle structure 5a.
FIG. 5 shows a connection structure for fibers 1a.
FIG. 6 (a) shows a multi-core fiber 3a.
FIG. 6 (b) shows a multi-core fiber 3b.
FIG. 7 (b) shows a multi-core fiber 3.
FIG. 8 (b) shows a bundle structure 5d.

DESCRIPTION OF SOME EMBODIMENTS (First Embodiment)

Figure 1:
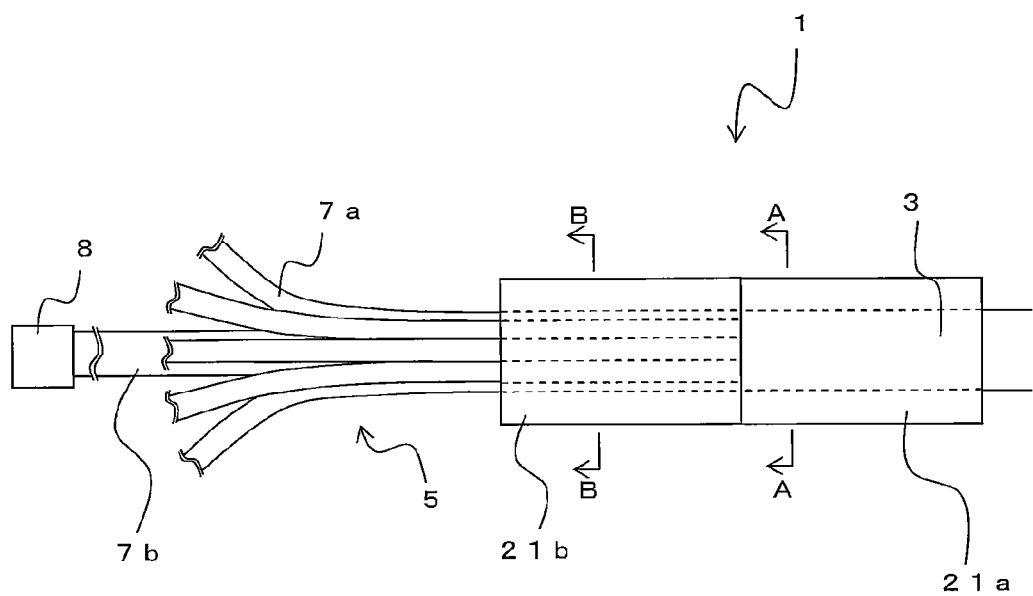
FIG. 1 shows a connection structure for fibers 1.
Figure 2A:
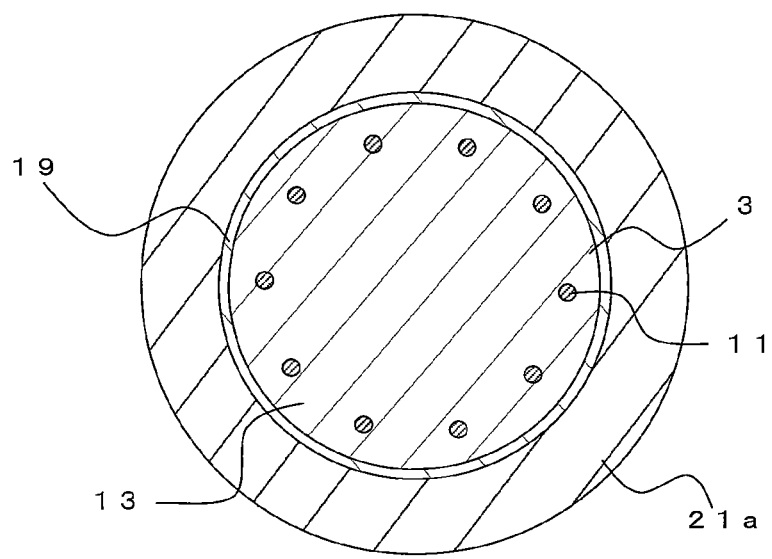
FIG. 2 (a) is a cross sectional view of the connection structure for fibers 1 taken along A-A line in FIG. 1.
Figure 2B:
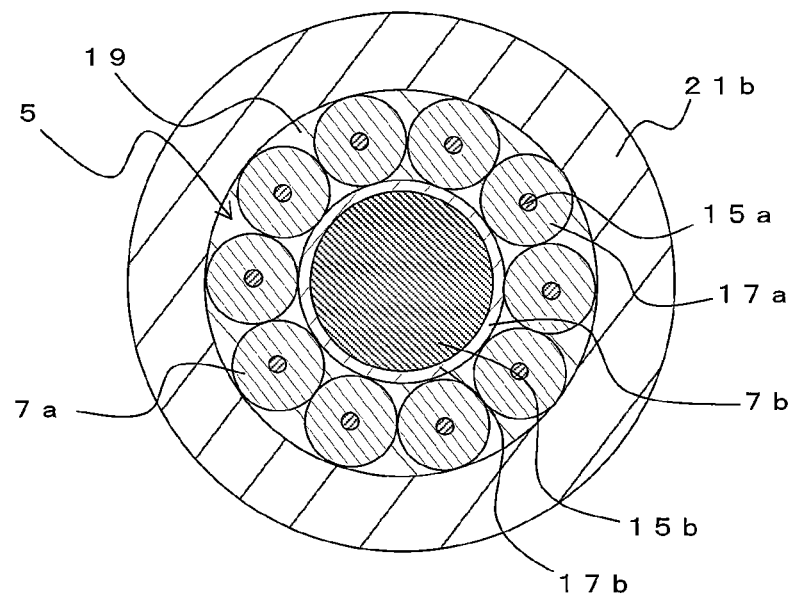

Hereinafter, a connection structure for optical fibers 1 will be described with reference to the accompanying drawings. FIG. 1 is a side view of the connection structure for optical fibers 1, FIG. 2 (a) is a cross sectional view taken along A-A line in FIG. 1, and FIG. 2 (b) is a cross sectional view taken along B-B line in FIG. 1. The connection structure for optical fibers 1 is a connection structure for a multi-core fiber 3 and a bundle structure 5 in which a plurality of optical fibers 7a and 7b are bundled.

A multi-core fiber 3 is a rare-earth doped multi-core fiber. The rare-earth doped multi-core fiber is, for example, an erbium doped multi-core fiber (EDF).

As shown in FIG. 2 (a), the multi-core fiber 3 is a fiber including a plurality of rare-earth doped cores 11 that are arranged at predetermined intervals with the circumference thereof and are covered by a cladding 13. The ten cores 11 in total are arranged on the concentric circle with regard to the center of the multi-core fiber 3 at the predetermined pitch. Therefore, all the cores 11 are at a fixed interval. Here, the pitch of the core 11 is, for example, approximately from 40 μm to 50 μm.

The multi-core fiber 3 is inserted into a capillary 21a and fixed by resin 19. The resin 19 is made of a material having a refractive index lower than the refractive index of a material configuring the cladding 13 of the multi-core fiber 3. That is, if the refractive index of the core 11 is n1, the refractive index of the cladding 13 is n2, the refractive index of the resin 19 is n3, and the refractive index of the capillary 21a is n4, then n1>n2>n3>n4.

As shown in FIG. 2 (b), the bundle structure 5 is obtained by arranging optical fibers 7a having equal diameters in a close-packed arrangement on the outer circumference of a center optical fiber 7b. In the present invention, "arranging optical fibers 7a in a close-packed arrangement on the outer circumference of a center optical fiber 7b" means that the optical fibers 7a on the outer circumference side are touching the outer circumference of the optical fiber 7b and are positioned so to be in contact with other adjoining optical fibers, and, ideally, all the optical core fibers on the outer circumference side and the optical core fibers at the center are in contact with each other.

The optical fibers 7a are signal light optical fibers that transmit signal lights. Also, the optical fiber 7b is a pump light optical fiber that transmits pump light. A light source for pump light 8 is connected to the optical fiber 7b. The light source 8 is, for example, a multi-mode pump light emitter with a wavelength of 980 nm. Preferably, the optical fibers 7a are single-mode optical fibers that are appropriate for long-distance transmission and the optical fiber 7b is a multi-mode fiber that is capable of transmitting large power. In this case, the signal light is, for example, a single-mode in a 1550 nm band and the pump light is, for example, a multi-mode in a 980 nm band. For the optical fiber 7a, the outer diameter thereof may be fixed along the longitudinal direction from the tip of the bundle structure 5, or the diameter of the parts of the bundle structure 5 may be decreased by etching or melt drawing. As for the optical fiber 7b, the outer diameter is always fixed along the longitudinal direction from the tip of the bundle structure 5 if not specified.

The number of optical fibers 7a is equal to the number of cores 11 in the multi-core fiber 3. That is, one optical fiber 7b is positioned at the center and ten optical fibers 7a are positioned around the optical fiber 7b. In the present invention, the number of optical fibers 7a and the number of the cores 11 are not limited to the illustrated examples.

The pitch of the cores 15a in the optical fibers 7a (the core pitch between the adjacent optical fibers 7a) is approximately equal to the pitch of the cores 11 in the multi-core fiber 3. That is, the pitch of the cores 11 is approximately equal to the outer diameter of the optical fiber 7a (the diameter of a cladding 17a).

Here, the outer diameter of the optical fiber 7b is larger than the outer diameter of the optical fiber 7a. Therefore, there are at least seven or more of the optical fibers 7a. Here, if the optical fiber 7b is positioned at the center with surrounding n optical fibers 7a arranged at equal intervals to obtain a bundle structure, Equation 1 and Equation 2 can be satisfied with R as a radius of the optical fiber 7b at the center and r as a radius of the surrounding optical fiber 7a.

$$R = \frac{1 - \sin\left(\frac{180°}{n}\right)}{\sin\left(\frac{180°}{n}\right)} r \quad \text{[Equation 1]}$$

$$R < \frac{1 - \sin\left(\frac{180°}{n}\right)}{\sin\left(\frac{180°}{n}\right)} r \quad \text{[Equation 2]}$$

The radii of the optical fibers 7b at the center and the surrounding optical fibers 7a are determined to satisfy the relations above so that the optical fibers 7a can be closely arranged on the outer circumference of the optical fiber 7b at the center. As mentioned above, although an equation with an equal sign as in Equation 1 is preferable in the present invention, it is difficult to precisely control the fiber diameter in the manufacturing process. In this case, the relation expressed in Equation 2 is preferable with R being slightly smaller than the ideal value (obtained with an equal sign) (or r being slightly greater than the ideal value). By doing so, the accumulated shifting of the pitch that is generated in the case in which the radius r of the peripheral fiber is small can be prevented, and the axial misalignment can be small at the time of connecting with the multi-core fiber. This relation can be applied not only to the bundle structure with a pump light introduction function for a rare-earth-doped multi-core fiber but also to a bundle structure for an ordinary annular-arrangement-type multi-core fiber.

The optical fiber 7a is inserted into a capillary 21b and fixed with the resin 19. The resin 19 is made of a material having a refractive index lower than that of the material configuring claddings 17a, 17b of the optical fibers 7a, 7b. That is, if the refractive indices of the core 15a and the cladding 17a in the optical fiber 7a are n11 and n12 respectively, the refractive indices of the core 15b and the cladding 17b in the optical fiber 7b are n13 and n14 respectively, the refractive index of the resin 19 is n1, and the refractive index of the capillary 21b is n16, then n11>n12>n15>n16, and n13>n14>n15>n16.

The bundle structure 5 and the multi-core fiber 3 are connected to one another by adhering or fusion splicing. On this occasion, the mode field diameter of the cores 15a and the cores 11 are substantially equivalent. In addition, the outer diameter of the bundle structure 5 (the diameter of circumscribed circle including the optical fibers 7a) is set so as not to be greater than the outer diameter of the multi-core fiber 3. The multi-core fiber and the optical fibers 7a, 7b are made of, for example, quartz glass.

The signal light of the core 15a in the optical fiber 7a is introduced to the core 11. Also, the pump light of the core 15b in the optical fiber 7b is introduced to the cladding 13. The pump light introduced to the cladding 13 is confined in the cladding 13 by the resin 19.

Introducing the pump light to the erbium doped multi-core fiber 3, for example, can excite the rare-earth material contained in the core 11 doped with the rare-earth element in the multi-core fiber 3 and can amplify the signal light inside the core 11. That is, the pump light can bring the energy level of the erbium ions in the core 11 to an excited state. By introducing the signal light to the core 11 in this state, stimulated emission of the excited erbium ions occurs and the intensity of the signal light is amplified.

As described above, according to the present embodiment, since the pump light is introduced to the approximate center of the rare-earth doped multi-core fiber 3, the distances to each of the cores 11 are approximately uniform and it is possible to approximately uniformly excite each signal light of the cores 11. Also, since the outer diameter of the optical fiber 7b, which is a pump light optical fiber that transmits pump light, is greater than the outer diameter of the optical fiber 7a, the pump light with large power can be introduced. Thus, according to the present embodiment, an efficient multi-core optical fiber amplifier can be obtained.

(Second Embodiment)

Figure 3:
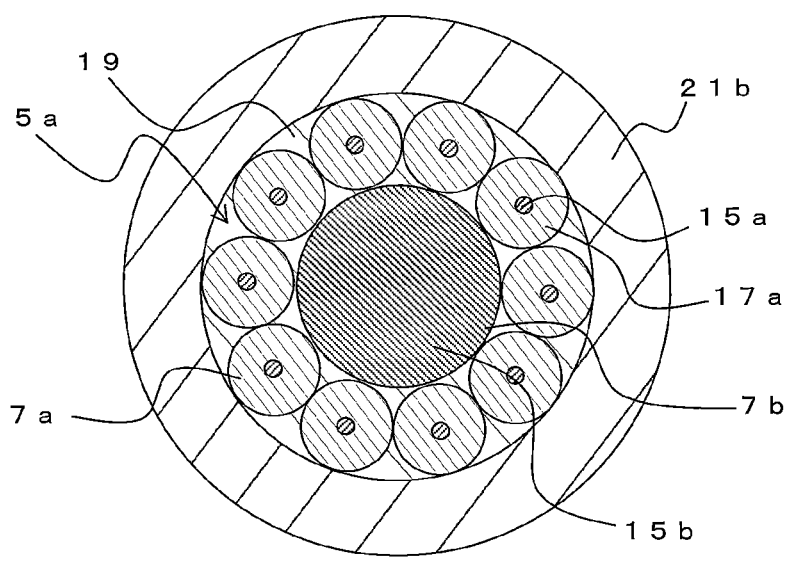

Next, a second embodiment will be described. FIG. 3 is a cross-sectional view of a bundle structure 5a. For the embodiments below, the same notations as in FIG. 1, FIG. 2(a) and FIG. 2(b) will be used for the components performing the same functions as in the connection structure for an optical fiber 1 and the like, and redundant explanations will be omitted.

The bundle structure 5a has a configuration that is almost the same as that of the bundle structure 5 except that the optical fiber 7b is formed only by the core 15b. The optical fiber 7b is preferably formed with a gradient-index optical fiber, for example. The refractive index in the gradient-index optical fiber varies gradually from the side of the outer circumference toward the center thereof, where the refractive index is at the maximum. Therefore, pump light is collected to the vicinity of the center of the optical fiber 7b and transmits.

As for the gradient-index optical fiber, it is not limited to the one in which the refractive index varies smoothly, and the change of the refractive index may be in a multi-stage type (two or more stages, for example) in which the refractive index is increased in the multi-stage steps toward the center.

Also, the cladding 17b at the tip section of the optical fiber 7b may be removed by chemical etching and the like. In this case, the part where the cladding 17b is removed is inserted completely into the capillary 21b. Thus, the pump light in the core 15b is confined by the surrounding resin 19.

The pump light that transmits in the core 15b of the optical fiber 7b is introduced to the cladding 13 of the multi-core fiber 3. By introducing the signal light to the cores 11 in this state, stimulated emission of the excited erbium ions occurs and the intensity of the signal light is amplified.

If the optical fiber 7b that does not have cladding 17b is used, there is a possibility that the pump light in the core 15b may leak out to the surrounding optical fibers 7a inside the capillary 21b. However, the pump light that leaks out to the optical fibers 7a is confined in the claddings 17a of the optical fibers 7a. Therefore, the pump light is introduced not only to the center of the multi-core fiber 3 (the part corresponding to the core 15b), but also to the parts that correspond to the claddings 17a of the each of the optical fibers 7a. For this reason, the pump light is introduced to the further vicinity of the core 11 of the multi-core fiber 3 so that the intensity of the signal light can be efficiently amplified. The present embodiment can also be realized by using a normal step-index type multi-mode fiber instead of the above-mentioned gradient-index optical fiber.

According to the second embodiment, the same effects as from the first embodiment can be obtained. Also, since the optical fiber 7b is formed only with the core 15b, the diameter of the core 15b can be increased for that amount, and the pump light with greater power can be introduced.

Also, leaking of the pump light to the surrounding optical fibers 7a allows the pump light to be introduced to the cladding 13 in the vicinity of the cores 11 of the multi-core fiber 3. Therefore, the pump efficiency is high. Also, coupling a part of the pump light with the signal light optical fiber that transmits signal light before introducing the pump light to the multi-core fiber 3 makes the population inversion of the vicinity of the connection section larger, raises the pump efficiency, and improves the noise figure.

(Third Embodiment)

Figure 4:
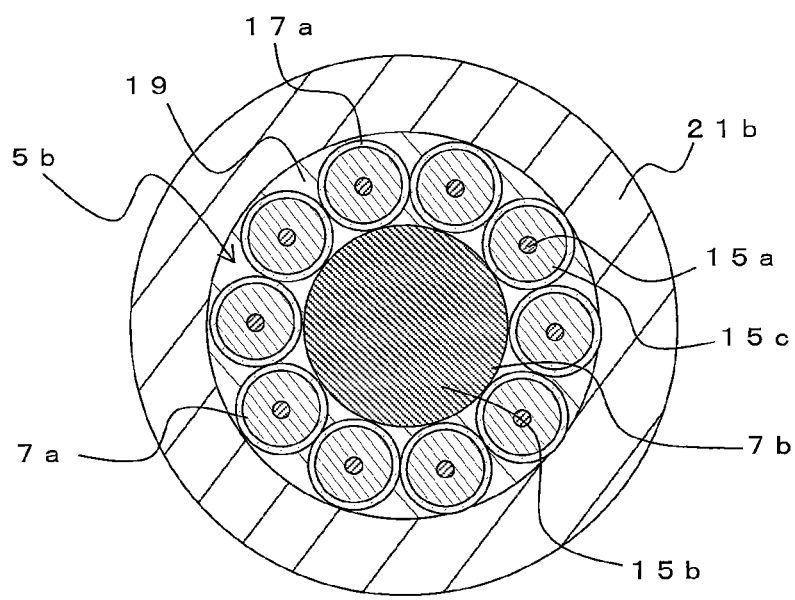
FIG. 4 shows a bundle structure 5b.

Next, a third embodiment will be described. FIG. 4 is a cross-sectional view of a bundle structure 5b. The bundle structure 5b has a configuration that is almost the same as that of the bundle structure 5 except that the structure of the optical fiber 7a is different.

In the optical fiber 7a, the core 15a, which is a first core, is provided at the center of the cross-section and a core 15c, which is a second core, is provided on the outer circumference of the core 15a. Furthermore, the cladding 17a is provided on the outer circumference of the core 15c. Although the example shown has the optical fiber 7b that is formed only with the core 15b, the optical fiber 7b may include a cladding.

If the refractive indices of the core 15a, 15c, and the cladding 17a are n21, n22, and n23 respectively, the refractive index of the core 15b of the optical fiber 7b is n24, the refractive index of the resin 19 is n25, and the refractive index of the capillary 21b is n26, it is preferable that n21>n22>n23 and n24>n25>n26. Furthermore, if n23>n24, the amount of the leaking of light from the optical fiber 7b to the optical fiber 7a increases, resulting in greater effects.

By doing in this way, the pump light introduced to the core 15b is coupled with the cores 15a through the medium of the cores 15c of the surrounding optical fibers 7a. Also, the pump light is confined in the cores 15c. When connected with the multi-core fiber 3 in this state, the pump light is introduced not only to the center of the multi-core fiber 3 (the part corresponding to the core 15b), but also to the parts corresponding to the claddings 17a of each of the optical fibers 7a. For this reason, the pump light is introduced to the vicinity of the core 11 of the multi-core fiber 3 so that the intensity of the signal light can be efficiently amplified.

According to the third embodiment, the same effects as from the second embodiment can be obtained. Also, since the pump light can be coupled with the cores 15a through the medium of the cores 15c of the optical fibers 7a before optically connecting with the multi-core fiber 3, the coupling efficiency between the pump light and the signal light can be enhanced.

(Fourth Embodiment)

Figure 5:
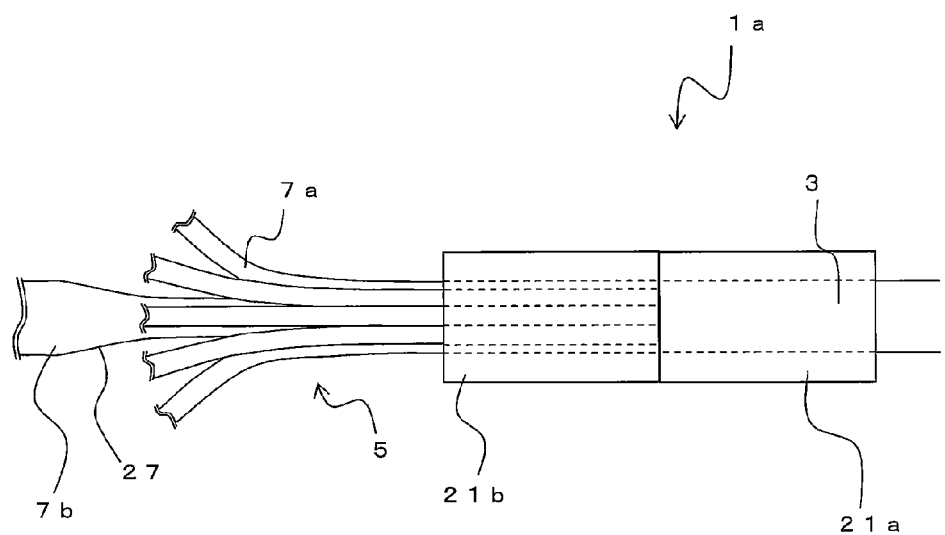

Next, a fourth embodiment will be described. FIG. 5 is a side view of a connection structure for fibers 1a. The connection structure for fibers 1a has a configuration that is almost similar to the connection structure for optical fibers 1 except that the optical fiber 7b that configures the bundle structure 5 is a tapered fiber.

The optical fiber 7b is connected to the light source 8, which is omitted in the drawing. Also, the optical fiber 7b has a tapered section 27, which is an outer diameter varying section, formed in a part thereof. With the tapered section 27, the diameter of the optical fiber 7b is reduced toward the tip thereof. A tapered fiber can be obtained, for example, by melting-heating and drawing a part of the optical fiber 7b. In this case, it is possible to decrease the outer diameter of the optical fiber 7b while maintaining the core/cladding diameter ratio thereof. That is, the thickness of the cladding can be decreased.

As above, inserting and fixing the part in which the cladding thickness is thin together with the optical fiber 7a into the capillary 21b makes it easier for the pump light in the optical fiber 7b to leak out to the optical fibers 7a. For this reason, the pump light is introduced to the further vicinity of the core 11 of the multi-core fiber 3 so that the intensity of the signal light can be efficiently amplified.

According to the fourth embodiment, the same effects as from the second embodiment can be obtained. Also, the diameter of the optical fiber 7b is decreased so that the bundle structure can be downsized. Also, since it is possible to decrease the cladding thickness, the pump light can be optically coupled with the surrounding optical fibers 7a, so that the pump light can be introduced to the cladding 13 in the vicinity of the cores 11 of the multi-core fiber 3. Therefore, the pump efficiency is high.

(Fifth Embodiment)

Figure 6A:
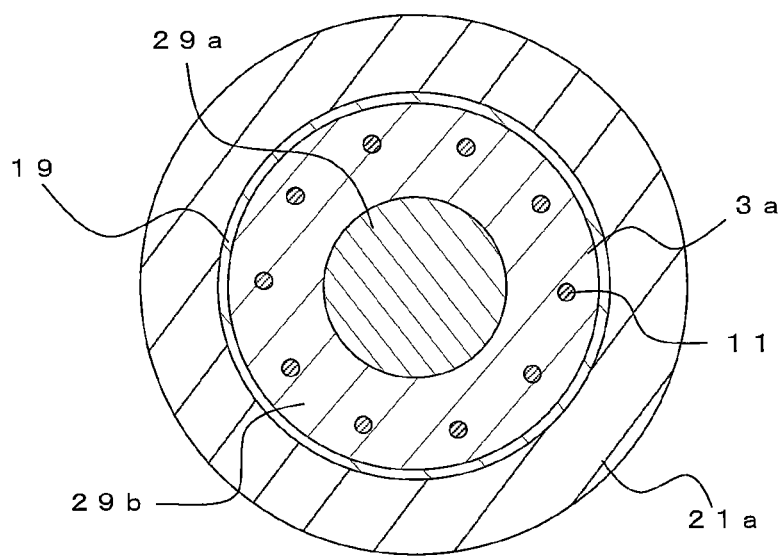
Figure 6B:
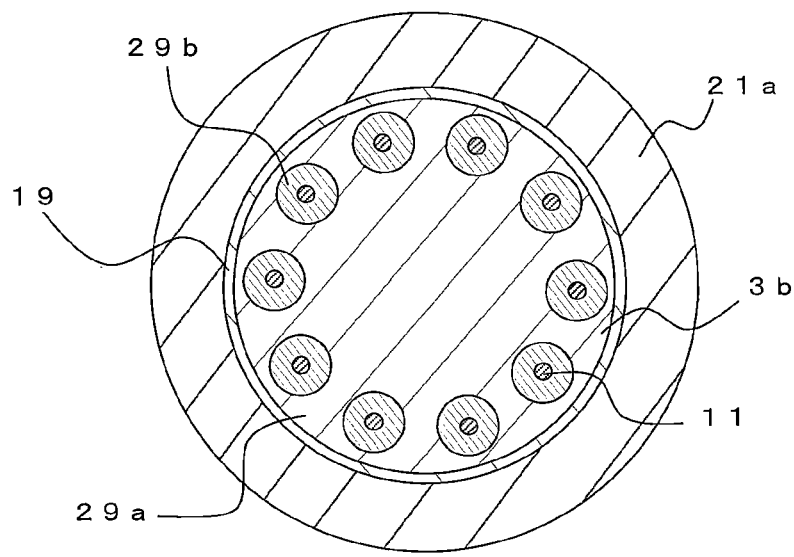

Next, a fifth embodiment will be described. FIG. 6 (a) is a cross-sectional view of a multi-core fiber 3a. The multi-core fiber 3a has a configuration that is almost the same as that of the multi-core fiber 3 except that the multi-core fiber 3a has a low-refractive index cladding 29b and a high-refractive-index cladding 29b.

The multi-core fiber 3a has the low-refractive-index cladding 29a provided at the approximately center of the cross-section thereof. On the outer circumference of the low-refractive-index cladding 29a, the high-refractive-index cladding 29b having a relatively higher refractive index than the low-refractive-index cladding 29a is provided. That is, the high-refractive-index cladding 29b is formed like a ring. The refractive indices of the low-refractive-index cladding 29a and the high-refractive-index cladding 29a are lower than the refractive index of the core 11 and higher than the refractive index of the resin 19.

The low-refractive-index cladding 29a is, for example, fluorine doped quartz glass. If the low-refractive-index cladding 29a is quartz glass, Ge and the like may be added to the high-refractive-index cladding 29b to raise the refractive index.

The cores 11 are placed inside the high-refractive-index cladding 29b. That is, at least the outer circumference of the cores 11 is covered with the high-refractive-index cladding 29b.

By configuring the cladding section of the multi-core fiber 3a as above with the low-refractive-index cladding 29a having a relatively low refractive index and the high-refractive-index cladding 29b having a relatively high refractive index, the pump light introduced to the cladding section of the multi-core fiber 3a can be collected to the high-refractive-index cladding 29b. Therefore, optical density of the pump light in the high-refractive-index cladding 29b can be increased compared to the whole cladding.

Also, the high-refractive-index cladding 29b is formed around the cores 11. That is, the pump light can be localized in the vicinity of the cores 11. Therefore, the intensity of the signal light in the cores 11 can be efficiently amplified.

The arrangement of the low-refractive-index cladding 29a and the high-refractive-index cladding 29b is not limited to the example shown in FIG. 6 (a). For example, the high-refractive-index cladding 29b may be divided into a plurality of parts and arranged as in the multi-core fiber 3b shown in FIG. 6 (b).

In the example shown in FIG. 6 (b), the high-refractive-index claddings 29b are provided on the outer circumference part of each of the cores 11 on the cross-section, covering the cores 11. That is, the high-refractive-index cladding 29b is provided concentrically with the core 11 as the center.

This configuration also can raise the optical density of the pump light in the high-refractive-index cladding 29b compared to the whole cladding. In addition, the high-refractive-index cladding 29b is formed around the core 11. Therefore, the intensity of the signal light in the cores 11 can be efficiently amplified. In this case, the refractive index may be gradient index inside the high-refractive-index cladding 29b.

According to the fifth embodiment, the same effects as from the first embodiment can be obtained. Also, configuring the cladding section of the multi-core fibers 3a, 3b with the low-refractive-index cladding 29a and high-refractive-index cladding 29b having different refractive indices allows the pump light to be collected to the high-refractive-index cladding 29b. Therefore, the optical density of the pump light increases, making it easier for the pump light to be coupled with the cores 11.

The multi-core fibers 3, 3a of the present embodiment can be combined with any of the forms of the bundle structures to configure a connection structure for optical fibers.

(Sixth Embodiment)

Figure 7A:
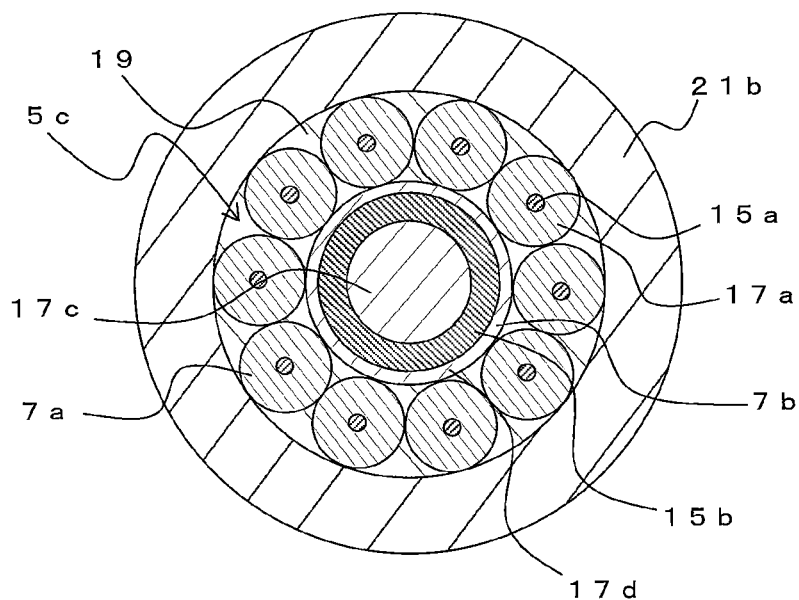
FIG. 7 (a) shows a bundle structure 5c.
Figure 7B:
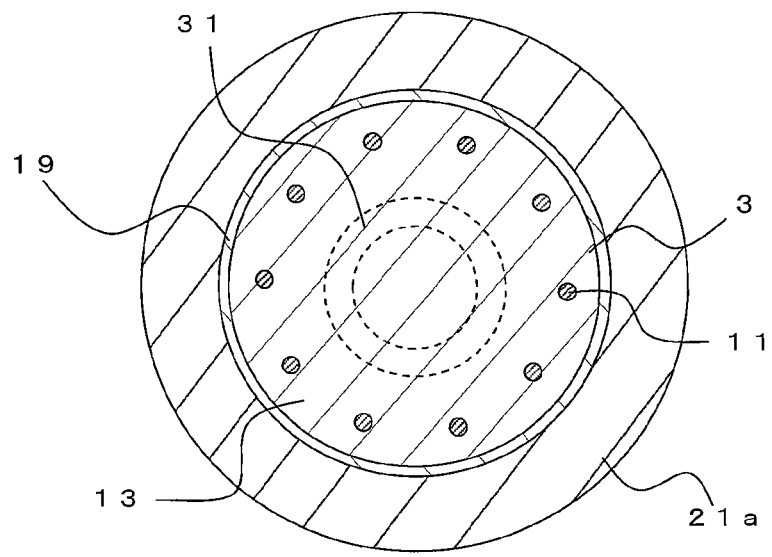

Next, the sixth embodiment will be described. FIG. 7 (a) is a cross-sectional view of a bundle structure 5c and FIG. 7 (b) is a cross-sectional view of the multi-core fiber 3. The bundle structure 5c is approximately similar to the bundle structure 5 except that the configuration of the optical fiber 7b is different.

In the optical fiber 7b of the bundle structure 5c, a center cladding 17c is provided at the center of the cross-section, the core 15b is provided on the outer circumference of the center cladding 17c, and a peripheral cladding 17d is provided on the outer circumference of the core 15b. That is, the core 15b and the peripheral cladding 17d are formed like rings. The refractive indices of the center cladding 17c and the peripheral cladding 17d are lower than the refractive index of the core 15b.

The pump light introduced to such an optical fiber 7b is localized in the core 15b. Thus, as shown in FIG. 7 (b), the pump light introduction section 31 in the multi-core fiber 3, which is the connection object, becomes ring-shaped. Thus, the pump light can be introduced to the parts close to the cores 11 so that the signal light in the cores 11 can be efficiently amplified.

According to the sixth embodiment, the same effects as from the first embodiment can be obtained. Also, since the pump light introduction section 31 is not at the center but at the part closer to the cores 11, the signal light in the cores 11 can be amplified more efficiently.

(Seventh Embodiment)

Figure 8A:
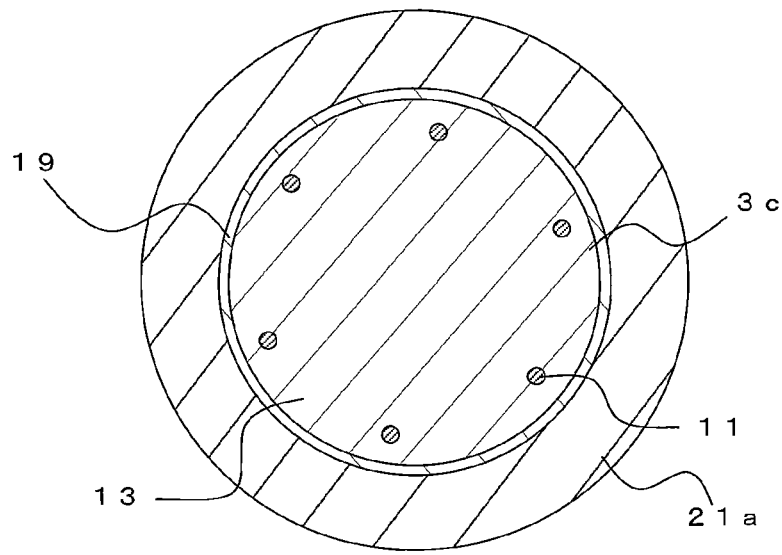
FIG. 8 (a) shows a multi-core fiber 3c.
Figure 8B:
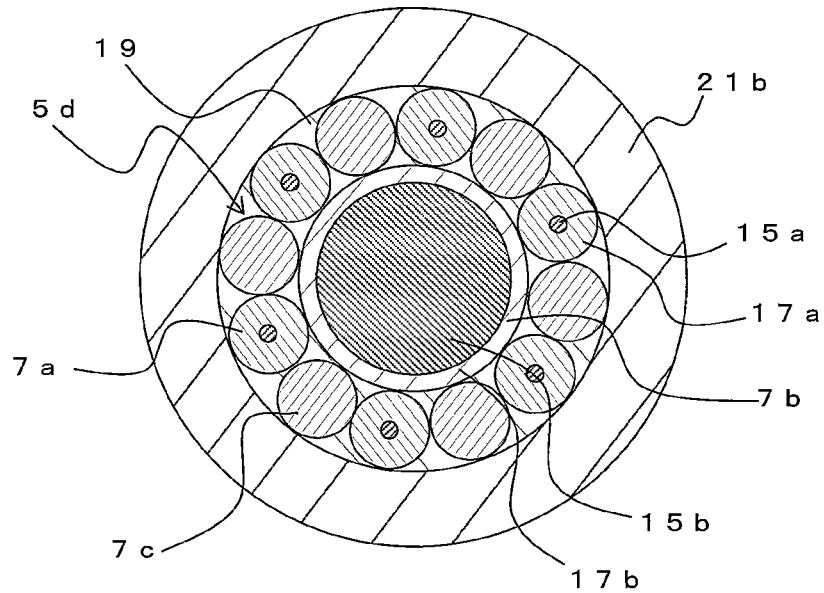

Next, a seventh embodiment will be described. FIG. 8 (a) is a cross-sectional view of a multi-core fiber 3c and FIG. 8 (b) is a cross-sectional view of a bundle structure 5d. The multi-core fiber 3c has a similar configuration as the multi-core fiber 3 and the like except that the pitch of the cores 11 is wider.

As mentioned above, the pitch of the cores 11 in the multi-core fiber 3d is approximately equal to the outer diameter of the optical fiber 7a of the bundle structure, which is the connection object. Therefore, if the pitch of the cores 11 is wide, then it is necessary to use the optical fibers 7a with larger diameters.

On the other hand, the optical fiber 7b, which is a pump light optical fiber that transmits pump light, is positioned at the center of the optical fibers 7a. Therefore, as shown in Equation 1, the outer diameter of the optical fiber 7b can be calculated when the diameter and the number of the optical fiber 7a are determined. For example, when six optical fibers 7a are in a close-packed arrangement on the outer circumference, the outer diameter of the optical fiber 7b is equal to the outer diameter of the optical fiber 7a.

Thus, if the outer diameter of the optical fiber 7b decreases, the output of the pump light that can be introduced decreases as well. Therefore, the pump efficiency decreases. However, if the optical fibers 7a on the outer circumference are not in a close-packed arrangement, there is a possibility of misalignment and the like.

So, as shown in FIG. 8 (b), the optical fibers 7a and dummy fibers 7c, which are the peripheral optical fibers, are alternately positioned on the outer circumference of the optical fiber 7b in the present embodiment. The dummy fiber 7c has the same diameter as the optical fiber 7a. The signal light optical fiber that transmits signal light 7a is interposed between the dummy fibers 7c. In the present invention, a close-packed arrangement is achieved when all the peripheral optical fibers 7a are touching the outer circumference of the optical fiber 7b as well as being in contact with the other adjacent optical fibers even if the optical fibers 7a are interposed between the dummy fibers 7c.

Here, if the radius of the center optical fiber 7b is R and the radius of the peripheral optical fiber 7a and the dummy fiber 7c is r, Equation 3 or Equation 4 can be satisfied.

$$R = \frac{1 - \sin\left(\frac{90}{n}\right)^\circ}{\sin\left(\frac{90}{n}\right)^\circ} r \quad \text{[Equation 3]}$$

$$R < \frac{1 - \sin\left(\frac{90}{n}\right)^\circ}{\sin\left(\frac{90}{n}\right)^\circ} r \quad \text{[Equation 4]}$$

As mentioned above, an equal sign as shown in Equation 3 is preferred in the present invention. However, since it is difficult to precisely control the fiber diameter in the manufacturing process, the relation expressed in Equation 4 is preferable with R being slightly smaller than the ideal value (obtained with the equal sign).

Arranging the n optical fibers 7a and dummy fibers 7c alternately in a close-packed arrangement as above can make the diameter of the optical fiber 7b larger.

For example, if the definition is given as in Equation 5, the maximum diameter of the optical fiber 7b can be enlarged as [(1+A)/A]·[B/(1+B)] times as in the case of Equation 1.

$$A = \frac{1 - \sin\left(\frac{180}{n}\right)^\circ}{\sin\left(\frac{180}{n}\right)^\circ} \quad \text{[Equation 5]}$$

$$B = \frac{1 - \sin\left(\frac{90}{n}\right)^\circ}{\sin\left(\frac{90}{n}\right)^\circ}$$

According to the seventh embodiment, the same effects as from the first embodiment can be obtained. Also, since the diameter of the optical fiber 7b can be increased, the pump light with greater power can be introduced. The number of dummy fibers 7c that are interposed by the optical fibers 7a is not necessarily be one, but may be two or more.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

For example, the structures described in each embodiment can be combined with one another.

DESCRIPTION OF NOTATIONS 1, 1a . . . connection structure for fibers
3, 3a, 3b, 3c . . . multi-core fiber
5, 5a, 5b, 5c, 5d . . . bundle structure
7a, 7b . . . optical fiber
7c . . . dummy fiber
8 . . . light source
11 . . . core
13 . . . cladding
15a, 15b, 15c . . . core
17a, 17b, 17c . . . cladding
21a, 21b . . . capillary
19 . . . resin 27 . . . tapered section
29a . . . low-refractive-index cladding
29b . . . high-refractive-index cladding
31 . . . pump light introduction section

What is claimed is:

1. A connection structure for an optical-fiber-bundle structure and a rare-earth-doped multi-core fiber, wherein
the optical-fiber-bundle structure comprises a pump light optical fiber that transmits pump light, which is arranged at the center thereof, and peripheral optical fibers, which are in a close-packed arrangement on the outer circumference of the pump light optical fiber, wherein the diameter of the pump light optical fiber is larger than the diameter of the peripheral optical fiber, and there are at least seven or more of the peripheral optical fibers, and at least a part of the peripheral optical fibers is a signal light optical fiber, and the equation $$R \leq \frac{1 - \sin\left(\frac{180}{n}\right)^\circ}{\sin\left(\frac{180}{n}\right)^n} r$$

is satisfied with R as a radius of the pump light optical fiber that transmits pump light at the center and r as a radius of each of the n peripheral optical fibers; and
the rare-earth-doped multi-core fiber comprises cores, which are optically connected with the signal light optical fiber at a predetermined pitch on a same circumference, and a cladding, which has a refractive index lower than that of the cores, covers the cores, and are optically connected with the pump light optical fiber, wherein the cladding includes a high-refractive-index cladding having a relatively high refractive index and a low-refractive-index cladding having a relatively low refractive index, and the high-refractive-index cladding is on at least the outer circumference of each of the cores.

2. The connection structure for an optical-fiber-bundle structure and a rare-earth-doped multi-core fiber according to claim 1, wherein
a part of the peripheral optical fibers is dummy fibers; and
the signal light optical fiber is interposed between the dummy fibers and the signal light optical fibers are arranged at predetermined intervals.

3. The connection structure for an optical-fiber-bundle structure and a rare-earth-doped multi-core fiber according to claim 1, wherein
the pump light optical fiber is a multi-mode optical fiber; and the outer diameter of the pump light optical fiber is fixed along the longitudinal direction from the tip of the bundle structure to a light source connected to the pump light optical fiber.

4. The connection structure for an optical-fiber-bundle structure and a rare-earth-doped multi-core fiber according to claim 1, wherein
the end parts of the pump light optical fiber that transmits pump light and the signal light optical fibers are held by a capillary; and
at least a part of the pump light optical fiber inside the capillary is formed only by a core without claddings.

5. The connection structure for an optical-fiber-bundle structure and a rare-earth-doped multi-core fiber according to claim 1, wherein
the peripheral optical fiber is a signal light optical fiber, and the signal light optical fiber comprises
a center core;
a second core that is formed on the outer circumference of the center core and has a refractive index lower than the refractive index of the center core; and
a cladding that is formed on the outer circumference of the second core and has a refractive index lower than the refractive index of the second core.

6. The connection structure for an optical-fiber-bundle structure and a rare-earth-doped multi-core fiber according to claim 1, wherein
the pump light optical fiber is a tapered fiber having a tapered part in which the diameter thereof decreases towards the end part thereof.

7. The connection structure for an optical-fiber-bundle structure and a rare-earth-doped multi-core fiber according to claim 1, wherein
the pump light optical fiber comprises a center cladding, a core section that is arranged on the outer circumference of the center cladding having a refractive index higher than the refractive index of the center cladding, and a peripheral cladding that is arranged on the outer circumference of the core section and having a refractive index lower than the refractive index of the core section, and the core section is formed like a ring on the cross-section.

8. The connection structure for an optical-fiber-bundle structure and a rare-earth-doped multi-core fiber according to claim 1, wherein
the high-refractive-index cladding is formed on the outer circumference of each of a plurality of the cores; and
the high-refractive-index cladding is covered by the low-refractive-index cladding.

* * * * *